United States Patent [19]
Wolf

[11] Patent Number: 6,002,122
[45] Date of Patent: Dec. 14, 1999

[54] HIGH-SPEED LOGARITHMIC PHOTO-DETECTOR

[75] Inventor: Ralph C. Wolf, Santa Clara, Calif.

[73] Assignee: Transient Dynamics, Santa Clara, Calif.

[21] Appl. No.: 09/012,777

[22] Filed: Jan. 23, 1998

[51] Int. Cl.[6] .................................................. H01J 43/30
[52] U.S. Cl. ...................................... 250/207; 250/214 L
[58] Field of Search ............................... 250/214 R, 207, 250/214 L; 313/103 CM, 105 CM, 533–536

[56] References Cited

U.S. PATENT DOCUMENTS 3,586,443  6/1971  Hooper ...................................... 356/365
3,653,763  4/1972  Davies ........................................ 356/51
3,715,586  2/1973  Thomas et al. ...................... 250/363.01
3,733,491  5/1973  Holland, Jr. ............................. 250/207

Primary Examiner—Edward P. Westin
Assistant Examiner—Thanh X. Luu
Attorney, Agent, or Firm—Sierra Patent Group

[57] ABSTRACT

According to the present invention, a photomultiplier tube is used with a high-speed feedback mechanism to continuously modulate the gain of the tube in response to the size of the input signal. The gain of the tube and the anode current are independently converted to ideal logarithms. These signals are then subtracted from one another to reconstruct a true logarithmic representation of the optical signal. This log-light-level signal has a higher dynamic range and faster temporal response than has previously been achieved by other methods.

14 Claims, 5 Drawing Sheets

HIGH-SPEED LOGARITHMIC PHOTO-DETECTOR

BACKGROUND OF THE INVENTION

1. Field of the Invention

The present invention relates to photodetectors. More particularly, the present invention relates to photodetection systems employing photomultiplier tubes.

2. The Prior Art

Optical sensing is the process of converting optical signals (photons) into electrical signals (electrons). In most applications, where the optical signals are large, or the temporal frequencies are low, this is done using solid state devices known as Photodiodes. Photodiodes are inexpensive (typically $1 to $30) and simple to use. They have a high dynamic range, and can be very fast when the light levels are large.

For signals which are too dim to see, photodiodes become much slower, due to the relatively high capacitance of the diode and the small currents generated by the dim signals. Even though photodiodes have excellent dynamic range (they are linear over up to 14 orders of magnitude) their output is proportional to the optical signal, so in practice their useful dynamic range is quickly limited by subsequent electronics. (high speed analog to digital converters typically have a dynamic range of only 3.6 orders of magnitude).

When the optical signals are dim, and frequencies are high, photomultiplier tubes are typically used. Photomultiplier tubes are expensive (typically $100 to over $1000), are subject to damage from overloading input signals, such as ordinary room light, and require a high voltage (typically 1000 Volts) to operate. A photomultiplier tube consists of a photocathode, one or more dynodes (typically 10) and an anode. Individual photons striking the cathode have up to a 25% chance of dislodging an electron. These photoelectrons are then accelerated towards the first dynode by an electric field. When they strike the dynode they dislodge additional electrons, thus amplifying the signal. These secondary electrons then cascade towards the next dynode where they are again amplified. At the end of the dynode chain, the electrons are collected by the anode which carries them outside of the photomultiplier tube. At this point, the signal is large enough to be easily measured using conventional electronics, such as a transimpedence amplifier, followed by an analog-to-digital converter.

The gain at each dynode is a function of the energy of the incoming electron, which is proportional to the electric potential between that dynode and the previous stage. This relation is of the form:

$$G(v) = k \times v^a$$

where a is typically in the range of 0.6 to 0.8. The total gain of the tube is the product of the gains from all the dynodes. Typically, and as shown in FIG. 1, the bias voltages for the dynodes are generated by connecting a string of voltage-divider resistors between the cathode, all the dynodes, and ground. Typically the resistance, and therefore the voltage, between all of the dynodes and between the last dynode and anode are the same. This resistance, R, is used as a scaling constant. Typically, the resistance between the anode and the first dynode is 1.5R to 3.5R where R is usually between 10K and 100K ohms. A large negative voltage is then applied to the cathode, and the potential is divided up evenly across the dynodes by the voltage-divider resistor chain.

This conventional biasing scheme is useful for operating the photomultiplier tube at a single programmable gain. Altering the applied cathode voltage changes the gain according to the relation:

$$G(v) = k \times v^{a'}$$

where a' is typically in the range of 7.0 to 8.0. However, the large voltages involved make it difficult to change the gain quickly, due to parasitic capacitances and the large resistor values needed to limit power dissipation in the bias string. The conventional usage is to decide on a tube gain in advance, set the appropriate cathode voltage and then operate the tube at that voltage throughout the measurement operation.

In this configuration, the dynamic range of the photomultiplier tube is limited on the low end by the noise and gain characteristics of the transimpedance amplifier and, on the high end, by the ability of photomultiplier tube to deliver anode current. The anode current is limited by space charge effects within the tube, by bias string power consumption, and by the consumable nature of the material coating the dynodes. If the optical signals to be measured are short pulses with low duty cycles, then capacitors can be placed across the last few bias resistors to improve pulse linearity. However, this trick does not help for bright signals which have a high duty-cycle, or which last more than a few tens of microseconds.

Logarithmic compression has been employed in the prior art in applications such as optical densitometers. These are devices used by photographic labs to check the darkness of an exposed and processed piece of film. However, they only operate over time scales of milliseconds to seconds. Examples of the use of this technique are found in U.S. Pat. Nos. 3,586,443, 3,653,763, and 3,733,491.

Additional examples of photomultiplier tube gain modulation appear in a number of forms, including methods for pre-setting the gains of various tubes which share a common HV supply, AGC circuits for making qualitative measurements, photomultiplier tube overload protection circuits, and fast gain switching circuits.

BRIEF DESCRIPTION OF THE INVENTION

According to the present invention, a photomultiplier tube is used with a high-speed feedback circuit to continuously modulate the gain of the tube in response to changes in the anode current. This feedback circuit is designed to keep the anode current within a safe operating range at all times. The gain of the tube and the anode current are independently converted to ideal logarithms. These signals are then subtracted from one another to reconstruct a true logarithmic representation of the optical signal. This combined signal is capable of accurately representing a significantly larger range of input signals than can be measured by PMTs using the conventional fixed biasing scheme.

BRIEF DESCRIPTION OF THE DRAWING FIGURES

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

According to the present invention, apparatus and a method have been developed for rapidly and precisely controlling the gain of the photomultiplier tube. The photomultiplier tube is used with a high-speed feedback mechanism to continuously modulate the gain of the tube in response to the anode signal. The gain of the tube and the anode current are independently converted to ideal logarithms. These signals are then subtracted from one another (the log-space equivalent of division) to reconstruct a true logarithmic representation of the optical signal. By this method, the dynamic range of the photomultiplier tube can be extended to at least 6 orders of magnitude, for continuously varying signals with bandwidth of up to 25 MHz, and possible more.

Figure 2:
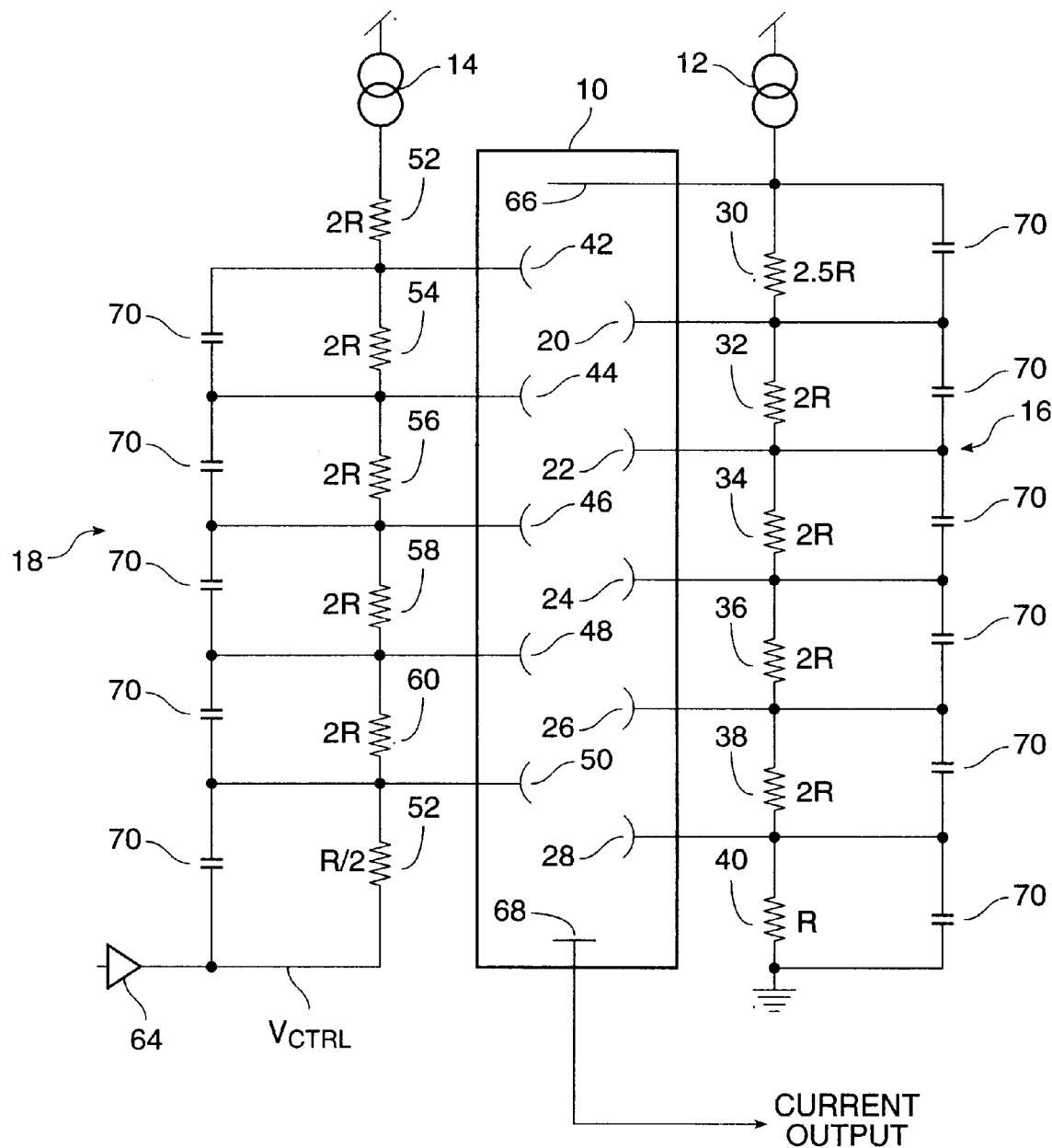
FIG. 2 is a schematic diagram illustrating biasing of a photomultiplier tube according to the present invention.

Referring now to FIG. 2, a schematic diagram illustrates biasing of a photomultiplier tube according to the present invention. In the illustrative embodiment of the present invention disclosed herein, a photomultiplier tube 10, such as the Hamamatsu R1166, furnished with ten dynodes, is depicted, although persons of ordinary skill in the art will appreciate that the invention could easily be adapted to photomultiplier tubes from different manufacturers having different numbers of dynodes.

The photomultiplier tube 10 is biased by two matched constant current sources 12 and 14 which drive two separate bias resistor strings 16 and 18, one for the odd, and one for the even dynodes. The bias resistor string 16 for the even dynodes 20, 22, 24, 26, and 28 includes series-connected resistors 30, 32, 34, 36, 38, and 40 driven by constant current source 12, and is referenced to ground. Resistors 32, 34, 36, and 38 have the same value 2R, while resistor 30 has a value of 2.5R and resistor 40 has a value of R.

The other bias resistor string 18 for the odd dynodes 42, 44, 46, 48, and 50, includes series-connected resistors 52, 54, 56, 58, 60, and 62, driven by constant current source 14. Bias resistor string 18 is referenced to a fast variable voltage source, Vctrl at the output of amplifier 64. Resistors 52, 54, 56, 58 and 60 have the same value 2R, while resistor 62 has a value of R/2. Even though Vctrl may vary rapidly, the constantcurrent sources driving the bias strings require only fixed DC voltages to operate.

Figure 1:
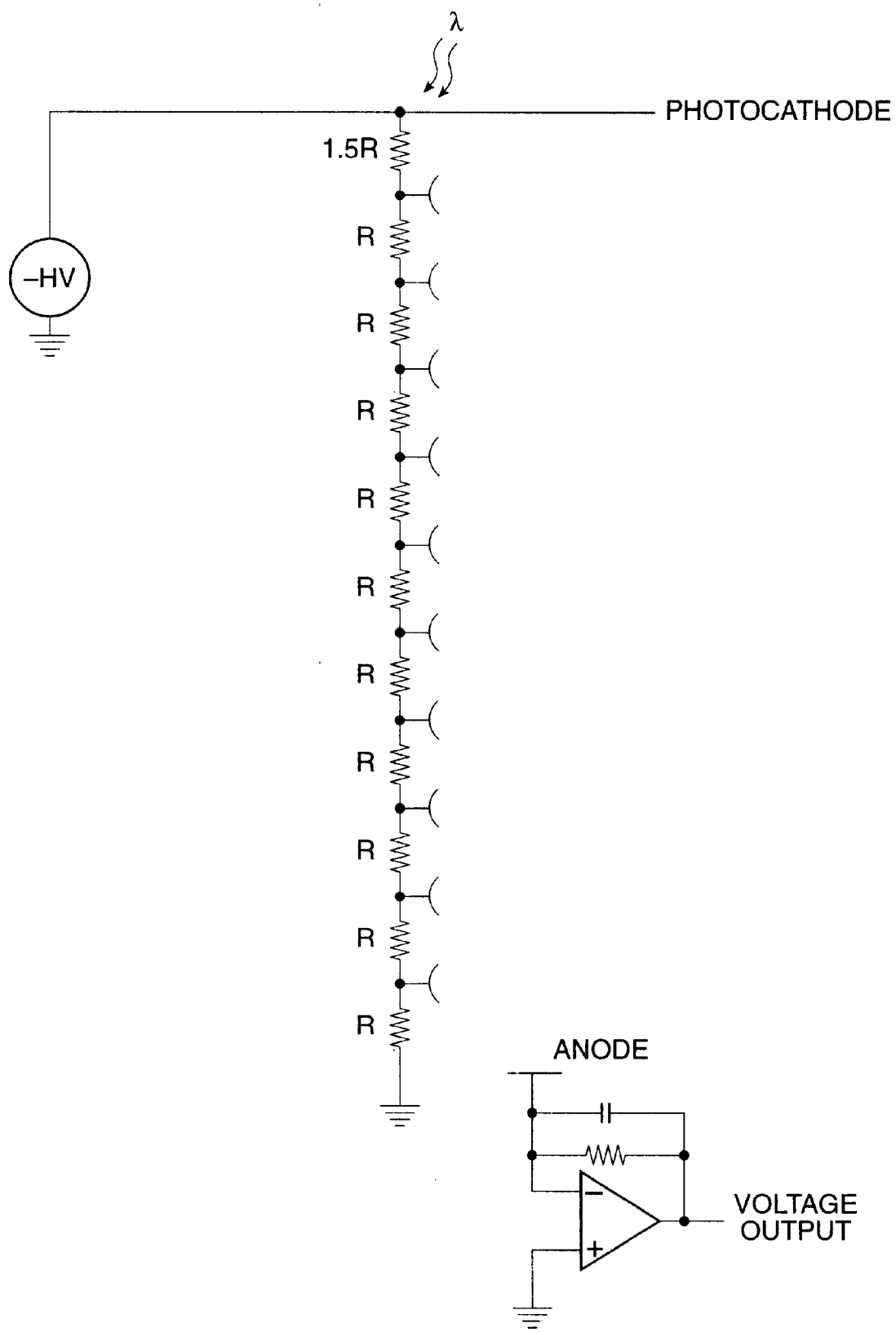
FIG. 1 is a schematic diagram illustrating conventional prior-art biasing of a photomultiplier tube.

As will be appreciated by persons of ordinary skill in the art, the values of the resistors 30, 40, 52, and 62 are chosen to offset the voltages at adjacent dynodes such that the voltage between adjacent dynodes decreases from the voltage at the cathode 66. Furthermore, when Vctrl is equal to 1.5 times the voltage on dynode 28, all the dynode voltages are the same as they would be if the conventional bias scheme of FIG. 1 is used. This voltage is called Vmax, the maximum gain control voltage.

Since the inter-dynode voltage within each of the two bias resistor strings is constant, capacitors 70 may be placed in parallel with all the bias resistors, except resistor 52, to lower the dynamic impedance of the bias strings. These capacitors can be made arbitrarily large, (i.e., 0.1 $\mu$F) without affecting the speed of the gain control circuit disclosed herein.

When Vctrl is equal to Vmax, the photomultiplier tube operates at its maximum gain. As Vctrl is made less negative, the inter-dynode voltages become alternately larger and smaller than their conventional values in the circuit of FIG. 1. For example, as Vctrl is made less negative, the potential between dynodes 48 and 26 decreases while the potential between dynodes 48 and 24 increases. Therefore the gain at each dynode alternately increases or decreases. However, the gain decreases faster on the even dynodes than it increases on the odd dynodes. As a result, the overall photomultiplier tube gain decreases.

As Vctrl approaches 0.5 times the voltage on dynode 28, the pairs of odd and even dynodes approach the same voltage and the overall tube gain is minimized. This voltage is called Vmin.

As Vctrl approaches Vmin, the system becomes less accurate, due to component mismatches in the two bias strings. However, the circuit will still continue to attenuate the signal. In principle, by holding Vctrl slightly less negative than Vmin, the anode current can be completely shut off. This enables built in overload protection, with a fast recovery when the overload ends.

Figure 3:
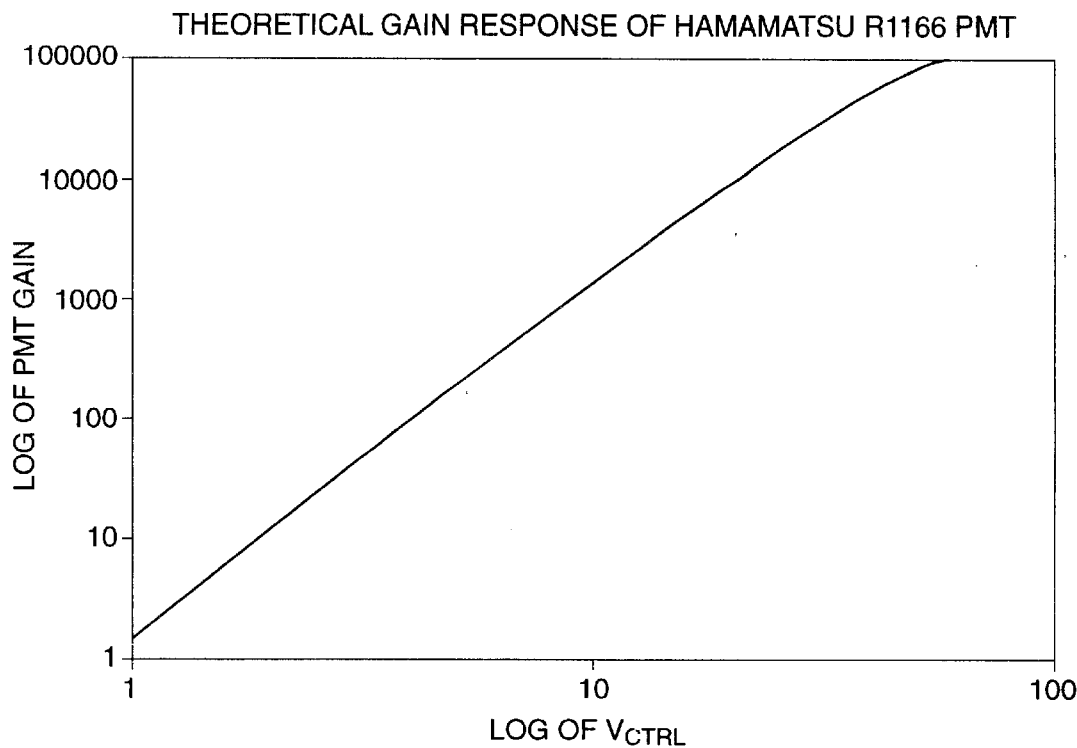
FIG. 3 is a graph illustrating the theoretical gain response of a photomultiplier tube as a function of control voltage.

FIG. 3 is a graph illustrating the theoretical gain response as a function of Vctrl, for the R1166 photomultiplier tube, biased at 700 Volts. It may be seen that the response is nearly a straight line in log-log space, over about 4 orders of magnitude in gain. This degree of gain modulation is accomplished with a control voltage swing of less than 100 volts. In addition, the control voltage is near ground. No control signals need to be sent across the large bias voltage to the cathode side of the photomultiplier tube. This combination of relatively low voltage swing and near ground potentials enables the design of a simple and high-speed feedback loop to control the tube gain.

Figure 4:
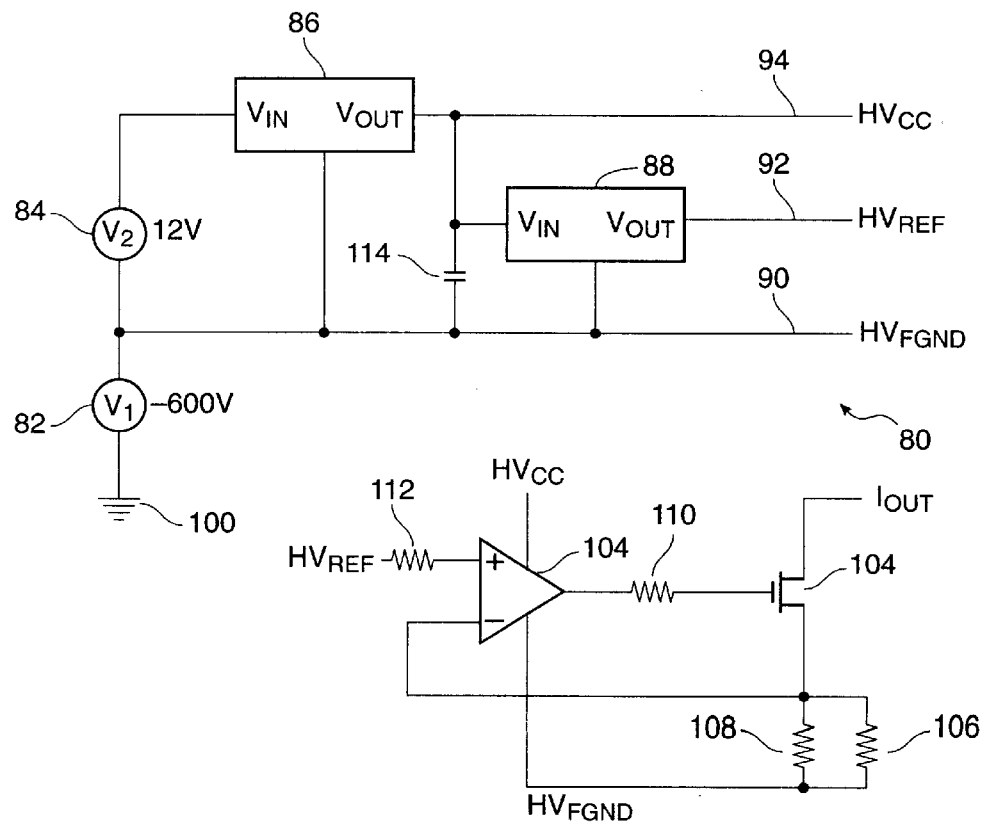
FIG. 4 is a schematic diagram of an illustrative circuit for implementing the current sources of FIG. 2.

The accurate matched current sources 12 and 14 of FIG. 2 needed to drive the two bias strings can each be implemented as shown in circuit 80 of FIG. 4 using only two fixed voltage supplies, high voltage supply 82 and low-voltage supply 84, connected as shown. Unlike the supplies used with conventionally biased PMTs, the HV supply need not be particularly stable, because the current source acts as series regulator. High-voltage supply 82 may be a commercially-available high-voltage supply, such as a Model E06 available from EMCO High Voltage of Sutter Creek Calif., and low-voltage supply 84 may be a commercially-available 12V DC-DC converter with a high isolation voltage, such as a Model UWR-12/250-D12 available from DATEL of Mansfield Mass. Voltage regulator 86 is a standard 3-terminal linear voltage regulator supplying a regulated voltage of 9 volts. Voltage regulator 88 is a precision 3 terminal voltage reference providing a voltage reference of 2.500 volts. Lines 90, 92, and 94 are used to power the remainder of the circuit elements of FIG. 4. High-voltage power supply 82 forms a high voltage "floating" ground, HVFGND at line 90, for the current sources. Low-voltage power supply 84 and voltage regulators 86 and 88 are referenced to this floating ground to generate the 2.5V reference voltage at line 92 and the 9 volt supply at line 94 used by the current source.

Amplifier 102 is a moderate-speed, low offset, operational amplifier and MOS transistor 104 is a high-voltage low capacitance N-channel MOSFET. These devices are well known commodities to any person of ordinary skill in the art, and suitable alternatives are available from numerous manufacturers, including Linear Technology, Analog Devices, BurrBrown, Supertex, Zetex, Motorola and National Semiconductor.

Resistor 106 is a precision 1,300 ohm, 0.1% resistor (Panasonic) which is trimmed to 1250 ohms by Resistor 108, an ordinary 1% resistor. Amplifier 102 adjusts the voltage at the gate of MOS transistor 104 to maintain a constant 2.500 volts across the 1,250 ohm combination of resistors 106 and 108 to HVFGND. This results in a precise 2.000 mA current flowing through MOS transistor 104. Since the gate of MOS transistor 104 is isolated, all the current must come from the load, at the drain of MOS transistor 104.

Resistors 110 and 112, and capacitor 114 are used, according to standard design practices, to correct for non-ideal behavior in the components. Resistor 110, which may have a value of about 50 ohms in the embodiment shown, isolates amplifier 102 from the gate capacitance of MOS transistor 92. Resistor 112, which may have a value of about 1,250 ohms in the embodiment shown, compensates for the input bias current of amplifier 90. Capacitor 114, which may have a value of about 1 $\mu$F in the embodiment shown, is a decoupling capacitor.

Figure 5:
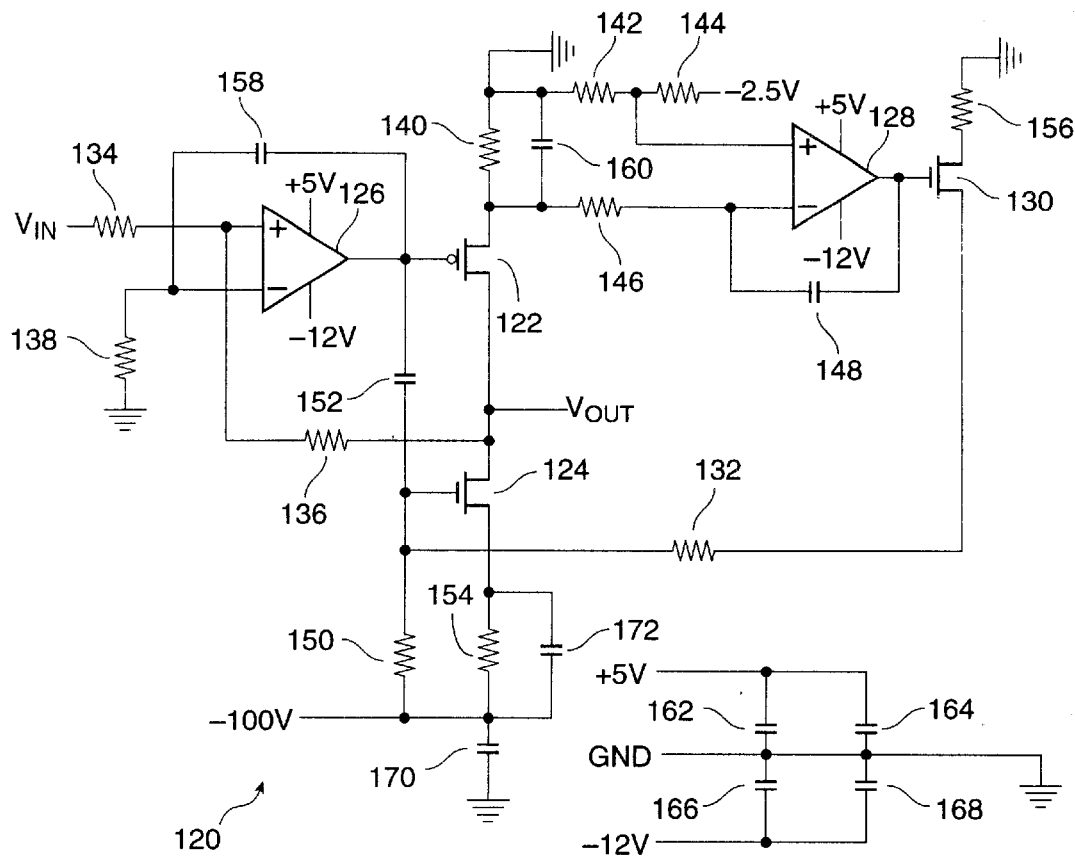
FIG. 5 is a schematic diagram of an illustrative implementation of the amplifier used to drive the active dynode biasing string in the photomultiplier tube of FIG. 2.

The high voltage amplifier 64 of FIG. 2 is a high-speed linear amplifier with a gain of about 35. FIG. 5 is a schematic diagram showing one implementation of a suitable amplifier circuit 120. Amplifier circuit 120 of FIG. 5 uses three power supplies and one voltage reference (not shown), having nominal output voltages of +5V, −12V, −100V, and −2.500 respectively. The output is driven by high voltage MOS transistors 122 and 124 which are wired in a high-gain, common-source configuration. To minimize drain capacitance, the normal operating range of the output is restricted to −25V to −75V. Amplifier 126 controls MOS transistor 122 directly, but only controls the high-frequency part of MOS transistor 124. The DC component of MOS transistor 124 is controlled by amplifier 128, through transistor 130 and resistor 132. Amplifier 128 actively adjusts the bias of MOS transistor 124 to maintain a constant source current on MOS transistor 122. By configuring the circuit so that the constant source current on transistor 122 is slightly larger than the largest possible current supplied to the load, it is ensured that transistor 124 is always slightly forward biased.

Restricting the operating range of the circuit of FIG. 5 and using active biasing ensures that neither MOS transistor 122 nor MOS transistor 124 is ever driven into saturation, or allowed to completely shut off. This enables a very fast amplifier to be built.

Using an active biasing circuit minimizes power consumption by carefully tracking changes in the power supply voltages and automatically compensating for changes in the threshold voltages of any of the MOS transistors. If conventional biasing schemes were used, the system would have to be designed for the worst case combination of component values and supply voltages. This means that under normal operation the power consumption would be significantly higher.

Resistors 134 and 136 set the gain of the amplifier. Resistor 138 compensates for input bias current in amplifier 126. Resistor 140 senses the DC bias current of MOS transistor 122. Resistors 142 and 144 set the reference voltage used to set the bias current of transistor 122. Resistor 146, together with capacitor 148, limits the bandwidth of the bias amplifier 128. Resistor 132 isolates the gate of MOS transistor 124 from the output capacitance of MOS transistor 130. Resistor 150 is a pull-up resistor to keep capacitor 152 charged. Resistors 154 and 156 limit the loop gain of bias amplifier 140 to prevent oscillations.

Capacitors 148 and 158, having values of 0.1 $\mu$F and 30 pF, respectively in the illustrated embodiment, are bandwidth limiting feedback capacitors, needed for stability. Capacitor 152, having a nominal value of 0.1 $\mu$F in the embodiment illustrated, is a DC blocking capacitor needed to allow amplifier 126 to control MOS transistor 124 even though it is outside the +5/12V operating range of amplifier 126. Capacitors 160, 162, 164, 166, 168, 170 and 172 are all bypass capacitors, and have nominal values of 0.1 $\mu$F in the embodiment illustrated.

Figure 6:
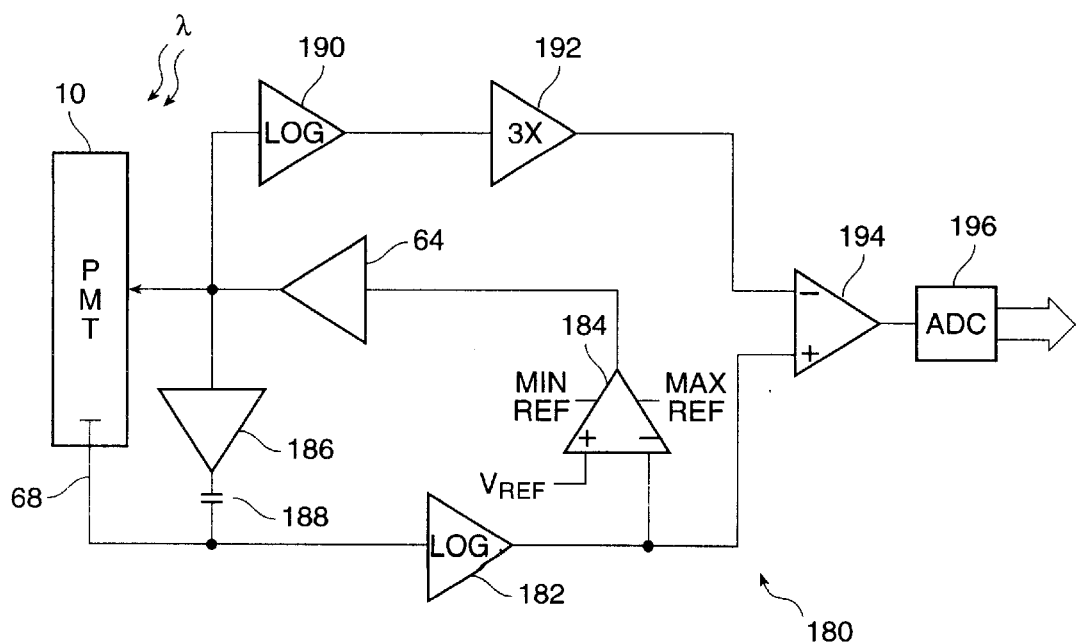
FIG. 6 is a schematic diagram of one embodiment of a logarithmic photodetector according to the present invention.

Referring now to FIG. 6, a schematic diagram illustrates one embodiment of a photomultiplier tube logarithmic photodetector 180 according to the present invention. Amplifier 64 from FIG. 1 which generates control signal Vctrl, and sets the voltage on bias resistor string 18 of FIG. 1, is a part of a feedback loop from anode 68 of photomultiplier tube 10. Logarithmic amplifier 182 is a four-decade log amplifier (such as a model 382 logarithmic amplifier available from Analog Modules, Inc. of Longwood, Fla.) and produces a signal which is the logarithm of the anode current of photomultiplier tube 10. Its output is sensed by servo amplifier 184 and compared to a reference voltage Vref. When the signal at the output of logarithmic amplifier 182 is below Vref, the servo amplifier 184 increases the input to high-voltage amplifier 64 which in turn increases the tube gain until the log signal matches Vref or the maximum PMT gain is reached. When the output of log amplifier 182 is above Vref, the tube gain is diminished by servo amplifier 184 until the signal again matches Vref, or the minimum photomultiplier tube gain is reached.

The normal operating range of Vctrl (the output of amplifier 64) is between Vmin and Vmax (typically from about −25 to about −75 volts). One implementation of the servo amplifier 184 employs a commercially-available limiting operational amplifier, such as a Model AD8036 available from Analog Devices of Norwood, Mass. Its output drives the input of amplifier 64. When such a limiting amplifier is used, the limits VminRef and VmaxRef are set as inputs to the amplifier as shown in FIG. 6 so that the output of amplifier 64 is never driven beyond the voltage range of Vmin and Vmax.

Inverting amplifier 186 has a gain of -0.05. It produces a signal which is −(½₀th) the amplitude of Vctrl. Capacitor 188 is chosen to have a value 20 times the sum of all parasitic capacitances between the odd (modulated) dynodes and the anode. A typical value of capacitor 188 is about 10 pF. The net effect of amplifier 186 and capacitor 68 is to inject into the anode 68 of photomultiplier tube 10 a current which exactly cancels the current injected from amplifier 64 by the parasitic capacitances within the tube.

A two-decade logarithmic amplifier 190 produces a signal which is the logarithm of the control voltage. The log Vctrl signal out of logarithmic amplifier 190 is amplified by a factor of about 3 in amplifier 192 to generate a signal which is representative of the gain of photomultiplier tube 10. Amplifier 192 is preferably a programmable gain amplifier having its gain programmed to a factor of about 3 to convert the log-gain signal to the same base as the log-current signal before performing the signal subtraction. The value of about 3 for the gain of amplifier 192 is derived from the slope of the log-gain vs. log-voltage curve of FIG. 3. The output of amplifier 192 is then subtracted from the output of logarithmic amplifier 182 by a differential amplifier 194 to generate the final analog log-light-level signal. This signal is digitized in analog-to-digital converter (ADC) 196 to produce a digitized log-light-level signal output. ADC 196 may typically have a resolution of 12 bits.

Figure 7:
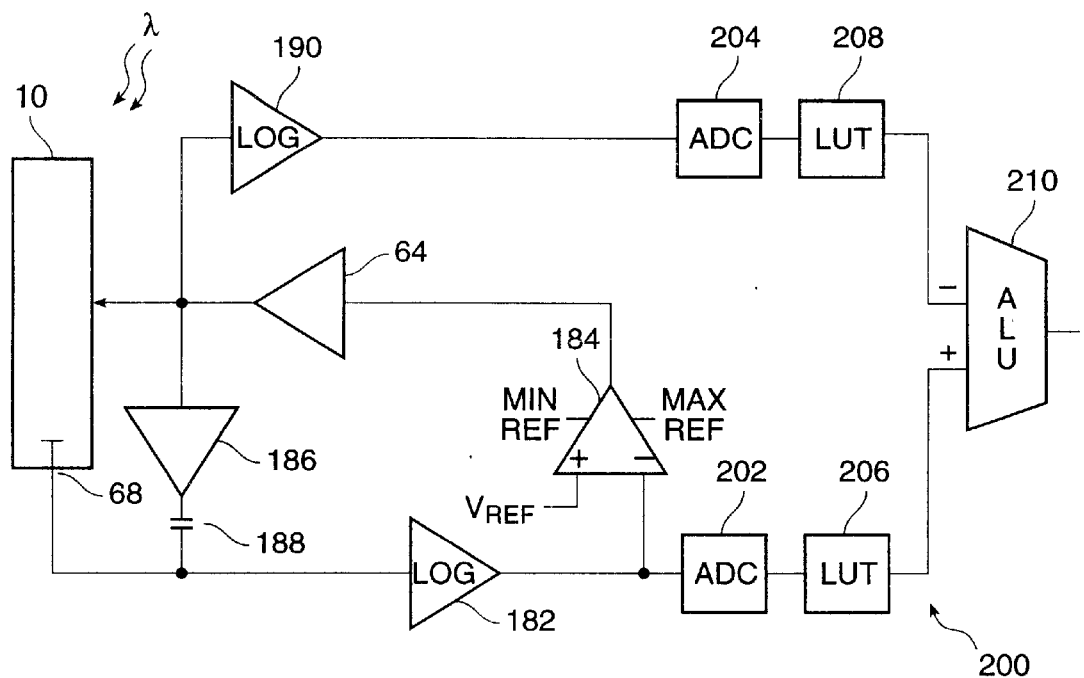
FIG. 7 is a schematic diagram of another embodiment of a logarithmic photodetector according to the present invention.

FIG. 7 is a schematic diagram illustrating another embodiment of a photomultiplier tube logarithmic photodetector 200 according to the present invention. The circuit of FIG. 7 is similar in operation to the circuit of FIG. 6 but is useful where less accurate, but still repeatable quasi-logarithmic signals are generated from the anode current and control voltage. As in logarithmic photodetector 180 of FIG. 6, logarithmic photodetector 200 of FIG. 7 employs control-voltage amplifier 64 in a feedback loop with logarithmic amplifier 182, a four-decade log amplifier, which produces a signal which is the logarithm of the anode current of photomultiplier tube 10. Its output is sensed by servo amplifier 184 and compared to a reference voltage. When the signal is below Vref, the servo amplifier increases the input to high-voltage amplifier 64 which in turn increases the tube gain until the log signal matches Vref or the maximum tube gain is reached. When the output of log amplifier 182 is above Vref, the tube gain is diminished until the signal again matches Vref or the minimum tube gain is reached. The normal operating range of Vctrl is between Vmin and Vmax (typically from about −25 to about −75 volts).

Because the actual gain characteristics of a photomultiplier tube may differ from the curve in FIG. 3, or because of errors in logarithmic amplifiers 182 or 190, the outputs of logarithmic amplifiers 182 and 190 are digitized separately by ADCs 202 and 204, respectively. Their outputs are used to interrogate programmable look up tables 206 and 208, respectively. As will be appreciated by persons of ordinary skill in the art, lookup tables 206 and 208 are used to implement completely general calibrations which convert the outputs of amplifiers 190 and 182 into ideal logarithmic representations of gain and anode current having a common pre-determined base. The output of lookup tables 208 is digitally subtracted from the output of lookup table 206 in arithmetic logic unit (ALU) 210 to produce a digitized log-light-level output signal of the same predetermined base.

As will be readily appreciated by persons of ordinary skill in the art, the lookup tables 206 and 208 would be experimentally determined for individual particular embodiments of the invention to remove any offsets, gain-errors, or higher order non-linearities in the circuits. Depending on the actual gain characteristics of the particular type of PMT being used, a linear amplifier, or an amplifier with some other non-linear transfer function, such as a power law (e.g., square root, cube root, etc.) may be substituted for log amplifier 190 without altering the substance of the invention.

Figure 8:
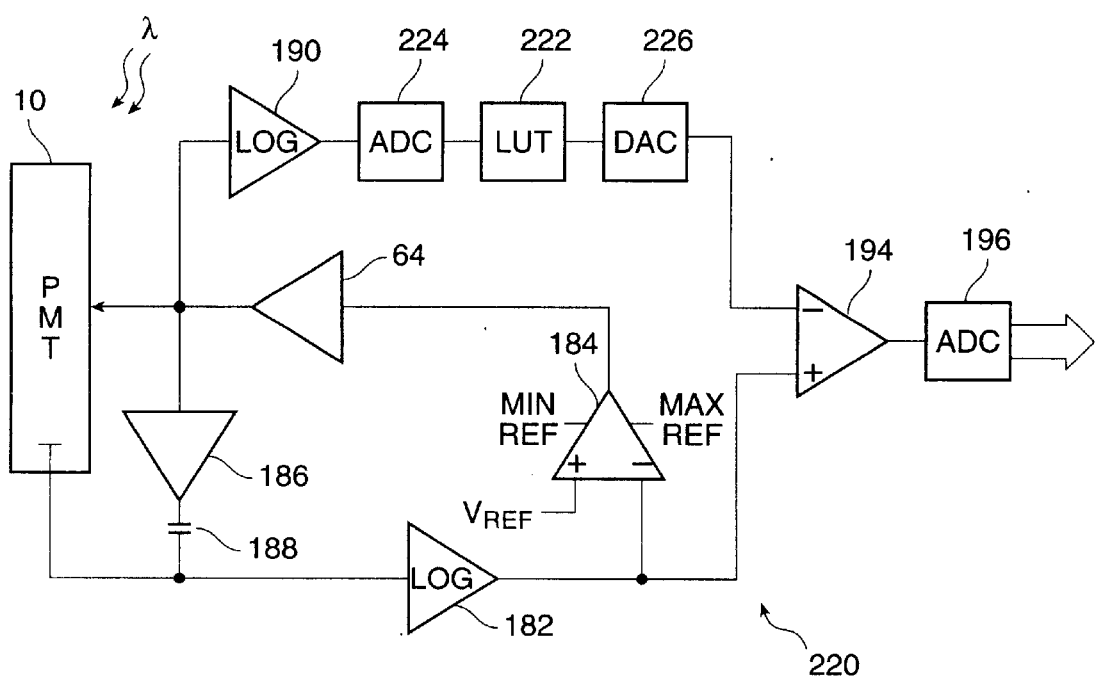
FIG. 8 is a schematic diagram of a hybrid analog/digital implementation of a logarithmic photodetector according to the present invention.

In addition to the analog implementation shown in FIG. 6 and the digital implementation shown in FIG. 7, a hybrid solution is also contemplated as another aspect of the present invention. Referring now to FIG. 8, a schematic diagram is presented of a hybrid analog/digital circuit implementation 220 of a logarithmic photodetector according to the present invention. Many of the circuit elements of the embodiment illustrated in FIG. 8 are the same as corresponding circuit elements of the embodiments of FIGS. 6 and 7, and are given the same reference numerals as the corresponding circuit elements in those embodiments. Persons of ordinary skill in the art will appreciate that the description of the operation of the circuits of FIGS. 6 and 7 apply to the operation of the circuit of FIG. 8 to the extent of the operation of the common elements of those circuits.

In the embodiment of FIG. 8, a single lookup table 222 is used to correct for deviations from ideal behavior in the gain response of the photomultiplier tube (digitized in ADC 224)) and to provide slope matching between the two logarithmic signals prior to performing the analog subtraction. The output of the lookup table 222 is converted back to an analog signal by digital-to-analog converter 226.

The hybrid approach of the embodiment of FIG. 8 has several advantages. A completely general calibration is provided by lookup table 222, but at the same time the system integration advantage of a single analog output signal is retained. In the implementation of FIG. 8, the high-speed ADC would most likely be a reusable part of a pre-existing instrument design. Because the gain signal typically changes more slowly than the anode current, ADC 224, lookup table 222, and digital-to-analog (DAC) 226 may be clocked at a slower speed than ADC 196. This reduces the amount of electronic noise generated by the digital circuits 222, 224, and 226, and allows less expensive components to be used for ADC 224, lookup table 222 and DAC 226.

A fine mesh dynode photomultiplier tube, such as the fifteen-dynode Hamamatsu R3432-01, may be used in the present invention in place of the conventional photomultiplier tube. These photomultiplier tubes have shorter transit times, higher pulse linearity, and better immunity to magnetic fields than conventional photomultiplier tubes. It is likely that such tubes are not currently in common usage because, with their small surface area, the mesh dynodes are particularly susceptible to damage from sustained overload signals. The present invention is able to make good use of their strong points, and also protect them from overload damage. Another photomultiplier tube which is advantageously employable in the present invention is a low-noise bi-alkali cathode photomultiplier tube, such as a model R2801, available from Hamamatsu Photonics, K.K. of Japan. The cathode of this tube was designed for lower dark current, but has the desirable property of having much lower resistivity than conventional photocathodes. This is important for the present invention, because for bright signals the photoelectron current in the cathode can cause significant voltage drops, which leads to an anomalous loss of gain.

While embodiments and applications of this invention have been shown and described, it would be apparent to those skilled in the art that many more modifications than mentioned above are possible without departing from the inventive concepts herein. For example, if for any given photomultiplier tube one of the odd dynodes was found to have an unusually large capacitive coupling to the anode, that dynode could be inserted into the passive bias string 16, to eliminate that coupling capacitance, at the cost of a reduction in overall dynamic range. Routine engineering tradeoffs between speed, power-consumption, noise, sensitivity, and dynamic range will motivate numerous minor design changes as the preferred embodiment disclosed herein is tailored to any given application. The invention, therefore, is not to be restricted except in the spirit of the appended claims.

What is claimed is:

1. A high-speed, high-dynamic range photodetector system for measuring the magnitude of an input signal comprising:

a photomultiplier tube having a cathode, an anode, and a plurality of spaced apart dynodes disposed between said cathode and said anode;

gain-varying means for continuously varying the gain of the photomultiplier tube over at least four orders of magnitude in less than about one microsecond in response to a control signal;

means, coupled to the anode of said photomultiplier tube, for generating a first signal which is the log of the anode current of said photomultiplier tube;

means for generating said control signal from said first signal, said control signal having a magnitude selected to maintain the anode current of said photomultiplier tube in a safe operating range;

means, responsive to said control signal, for compensating for parasitic capacitances from said control signal to said anode of said photomultiplier tube;

means, responsive to said first signal, for generating a second signal which is an idealized log representation of the anode current of the photomultiplier tube in a predetermined base;

means, responsive to said control signal, for generating a third signal which is an idealized log of the gain of said photomultiplier tube in said predetermined base;

means for subtracting said third signal from said second signal to provide a signal which is representative of the log of the magnitude of the input signal in said predetermined base.

2. The high-speed, high-dynamic range photodetector system of claim 1 wherein:

said means for generating said third signal comprises:
a first amplifier having a transfer characteristic, said first amplifier having an input coupled to said control signal, and an output;
an analog-to-digital converter having an input coupled to the output of said first logarithmic amplifier and a plurality of digital outputs;
a first lookup table having a plurality of inputs coupled to the plurality of digital outputs of said analog-to-digital converter and having a plurality of digital outputs;

said means for generating said second signal comprises:
a second logarithmic amplifier having a input coupled to said anode of said photomultiplier tube, and an output;
a second analog-to-digital converter having an input coupled to the output of said second logarithmic amplifier and a plurality of digital outputs;
a second lookup table having a plurality of inputs coupled to the plurality of digital outputs of said second analog-to-digital converter and having a plurality of digital outputs; and said means for subtracting comprises a digital subtractor circuit having a first set of inputs coupled to said plurality of outputs of said first lookup table, a second set of inputs coupled to said plurality of outputs of said second lookup table, and an output.

3. The high-speed, high-dynamic range photodetector system of claim 1, wherein the transfer function of said first amplifier is linear.

4. The high-speed, high-dynamic range photodetector system of claim 1, wherein the transfer function of said first amplifier is logarithmic.

5. The high-speed, high-dynamic range photodetector system of claim 1, wherein the transfer function of said first amplifier is a power law.

6. The high-speed, high-dynamic range photodetector system of claim 1 wherein:

said means for generating said third signal comprises:
a first amplifier having a transfer characteristic, said first amplifier having an input coupled to said control signal, and an output;
an analog-to-digital converter having an input coupled to the output of said first logarithmic amplifier and a plurality of digital outputs;
a lookup table having a plurality of inputs coupled to the plurality of digital outputs of said analog-to-digital converter and having a plurality of digital outputs; and
a digital-to-analog converter having a plurality of digital inputs coupled to the plurality of digital outputs of said first lookup table;

said means for generating said second signal comprises:
a second logarithmic amplifier having a input coupled to said anode of said photomultiplier tube, and an output; and said means for subtracting comprises an analog subtractor circuit having a first input coupled to the output of said digital-to-analog converter, a second input coupled to the output of said second logarithmic amplifier, and an output.

7. The high-speed, high-dynamic range photodetector system of claim 6, wherein the transfer function of said first amplifier is linear.

8. The high-speed, high-dynamic range photodetector system of claim 6, wherein the transfer function of said first amplifier is logarithmic.

9. The high-speed, high-dynamic range photodetector system of claim 6, wherein the transfer function of said first amplifier is a power law.

10. The high-speed, high-dynamic range photodetector system of claim 1 wherein:

said means for generating said third signal comprises a first amplifier having a transfer characteristic, said first amplifier having having a input coupled to said control signal, and an output;

said means for generating said second signal comprises:
a second logarithmic amplifier having a input coupled to said anode of said photomultiplier tube, and an output; and said means for subtracting comprises an analog subtractor circuit having a first input coupled to the output of said first logarithmic amplifier, a second input coupled to the output of said second logarithmic amplifier, and an output.

11. The high-speed, high-dynamic range photodetector system of claim 10, wherein the transfer function of said first amplifier is linear.

12. The high-speed, high-dynamic range photodetector system of claim 10, wherein the transfer function of said first amplifier is logarithmic.

13. The high-speed, high-dynamic range photodetector system of claim 10, wherein the transfer function of said first amplifier is a power law.

14. A method for operating a high-speed, high-dynamic range photodetector system for measuring the magnitude of an input signal comprising the steps of:

providing a photomultiplier tube having a cathode, an anode, and a plurality of spaced apart dynodes disposed between said cathode and said anode;

continuously varying the gain of the photomultiplier tube over at least four orders of magnitude in less than about one microsecond in response to a control signal;

generating a first signal which is the log of the anode current of said photomultiplier tube;

generating said control signal from said first signal, said control signal having a magnitude selected to maintain the anode current of said photomultiplier tube in a safe operating range;

compensating for parasitic capacitances from said control signal to said anode of said photomultiplier tube;

generating a second signal which is an idealized log representation of the anode current of the photomultiplier tube in a predetermined base;

generating a third signal which is an idealized log of the gain of said photomultiplier tube in said predetermined base;

subtracting said third signal from said second signal to provide a signal which is representative of the log of the magnitude of the input signal in said predetermined base.

* * * * *